United States Patent [19]

Ferguson

[11] Patent Number: 4,543,833
[45] Date of Patent: Oct. 1, 1985

[54] PRESSURE GAUGE WITH ADD-ON WRENCH FLATS

[75] Inventor: Walter J. Ferguson, Middlebury, Conn.

[73] Assignee: Dresser Industries, Inc., Dallas, Tex.

[21] Appl. No.: 705,842

[22] Filed: Feb. 25, 1985

Related U.S. Application Data

[63] Continuation of Ser. No. 486,147, Apr. 18, 1983, abandoned.

[51] Int. Cl.⁴ .............................................. G01I 19/06
[52] U.S. Cl. ...................................................... 73/741
[58] Field of Search ................ 73/738, 741, 756, 431, 73/732–737, 739, 740, 742, 743

[56] References Cited

U.S. PATENT DOCUMENTS

| | | | |
|---|---|---|---|
| 2,244,334 | 6/1941 | Hopkins | 73/732 |
| 2,393,552 | 1/1946 | Morpeth | 73/732 |
| 3,293,917 | 12/1966 | Vanderheyden | 73/741 |
| 3,370,470 | 2/1968 | Neugebauer | 73/739 |
| 4,175,444 | 11/1979 | Harland | 73/738 |

*Primary Examiner*—Donald O. Woodiel
*Attorney, Agent, or Firm*—Daniel Rubin

[57] ABSTRACT

Custom sized wrench flats of a relatively large dimension are weld attached to a round stock socket of a post-assembled pressure gauge. This enables cost effective pre-assembly of the gauge components while complying with code standard size requirements for the wrench flats.

5 Claims, 5 Drawing Figures

PRESSURE GAUGE WITH ADD-ON WRENCH FLATS

This application is a continuation of application Ser. No. 486,147, filed Apr. 18, 1983, now abandoned.

BACKGROUND OF THE INVENTION

1. The field of art to which the invention pertains includes the art of measuring and testing as directed to fluid pressure gauges.

2. Gauge instruments, and particularly pressure gauges or the like, have been widely used and are commercially available from a variety of manufacturing sources. Being that such pressure gauges enjoy very extensive commercial and industrial use, they are supplied by a plurality of manufacturers, and are regarded as high production items. Because they are sold in very price-conscious competition, each manufacturer instinctively strives to reduce product costs by improvements, however marginal, which reduce labor and/or materials that can contribute to cost savings in the end product.

All pressure gauges include a socket by which the gauge can be connected to a source of fluid pressure to be measured. In a typical construction, the gauge socket may be formed of bar stock of square or hexagonal cross-section whereby the unmachined surface can serve as wrench flats during installation and removal of the gauge. Despite the foregoing virtue of the square or hex section, it is highly desirable, and indeed preferable, to make the socket from round stock, i.e., of circular cross-section. Generally speaking, the advantages of the latter are threefold, namely: (a) for a given size, round stock is the most economical bar shape; (b) round stock geometry facilitates joining of the case and socket when welding or brazing is the method of choice; and (c) a round interface between socket and case facilitates sealing whether it be a metallurgical bond or mechanical seal.

When the socket is fabricated from round stock, it is common practice to mill or broach two parallel flats as wrenching surfaces. This metal removal, of course, reduces the distance across the wrench flats to a dimension substantially less than basic stock diameter with a dimension across the wrench flats less than the major diameter of the socket thread. As a consequence, the amount of torque that can be applied, for example, to a 7/8-inch diameter socket with 5/8-inch parallel flats without stripping the wrench flats is reduced substantially compared to other sockets from larger square or hex stock. While the machined, parallel flats generally offer sufficient strength for making up the process connection, some code standards, such as the German DIN standard No. 16288, require that the wrenching surface be square or hexagonal and of a size larger than the major thread diameter of the socket.

Needless to say, utilizing oversized bar stock of square or hexagonal cross section merely to accommodate the foregoing standard not only constitutes a waste in both labor and material, but at the same time it defeats the noted virtues for the use of round stock mentioned above. Despite recognition of the problem, a solution therefor has not heretofore been known.

SUMMARY OF THE INVENTION

This invention relates to pressure gauges and more specifically to a socket construction therefor able to meet the DIN wrench flat standard, while continuing to be formed of more economically advantageous round stock. This is achieved in accordance with the invention by forming the socket of round stock construction as before. After assembling the operating gauge components and socket to the gauge case, wrench flats of required size are added on by welding to the socket periphery. By this means, all the virtues of round stock construction are readily retained while any size wrench surface can be merely added to meet code requirements.

It is therefore an object of the invention to effect a novel socket construction for a pressure gauge having oversized wrench flats on a round stock socket construction.

Figure 1:
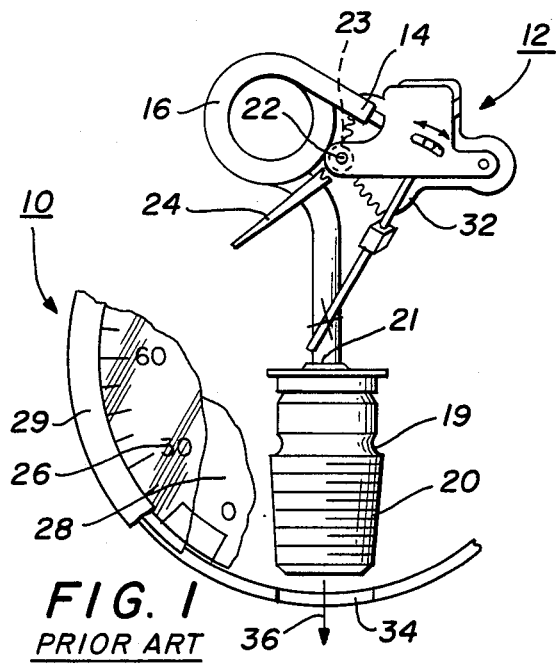
FIG. 1 is a fragmentary front elevation of a prior art pressure gauge with the components in pre-assembly relation to the case housing.
Figure 2:
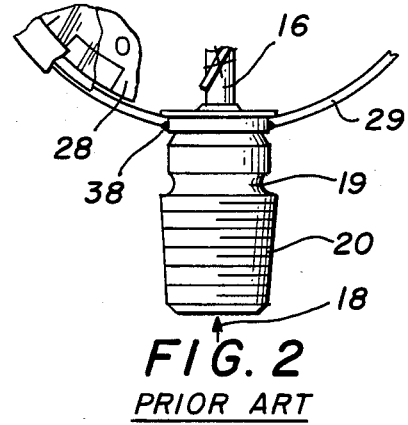
FIG. 2 is a fragmentary view of the post-assembly relation of the prior art pressure gauge of FIG. 1.

Referring now to the prior art gauge constructions of FIGS. 1 and 2, the pressure gauge thereof may, for example, comprise a type disclosed in U.S. Pat. No. 4,361,046. Briefly, pressure gauge 10 includes a floating amplifier 12 supported on the free end 14 of a coiled Bourdon tube 16. Fluid pressure represented by arrow 18 is received inward of round stock socket 19 that includes mounting threads 20 and a longitudinal bore 25. Socket 19 is weld connected at 21 to the fixed end of Bourdon tube 16 wherefrom fluid pressure 18 is conducted inwardly to effect displacement of tube end 14 in a well known manner.

Amplifier 12 floats conjointly with tube end 14 for operating segment gear 32 to effectively drive a pinion 23 on shaft 22 supporting a pointer 24. Arcuate displacement of the pointer via rotation of shaft 22 reflects values of pressure as represented by graduations 26 on dial face 28 supported in case 29. Because it is most difficult to effect weld 21 with the components arranged within the case, it is customary for the operating components and socket to be preassembled as shown in FIG. 1. Thereafter, socket 19 is passed downward (or rearward for a back connected gauge) through the case socket aperture 34 in the direction of arrow 36 until arranged in the manner of FIG. 2. Desirably, aperture 34 is then sealed about the received socket as, for example, by weld 38.

Figure 3:
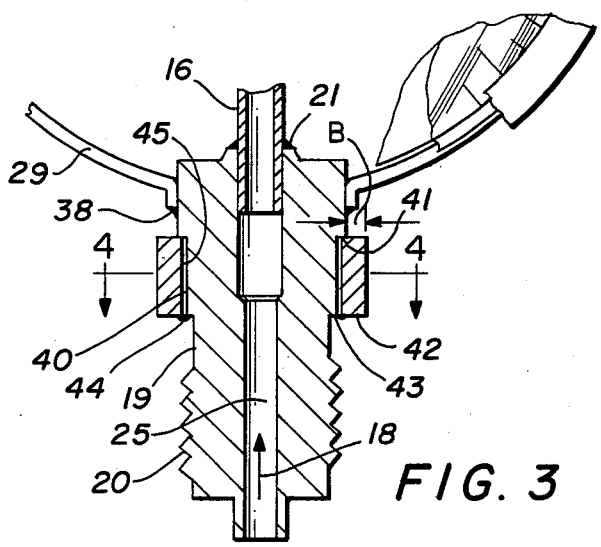
FIG. 3 is a sectional elevation generally corresponding to FIG. 2 of a socket construction in accordance with the invention.
Figure 4:
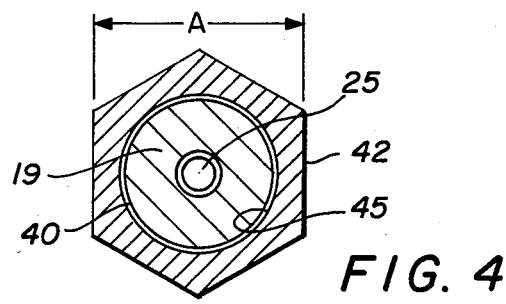
FIG. 4 is a sectional view as seen substantially along the lines 4—4 of FIG. 3.

Referring now to FIGS. 3 and 4, socket 19 for purposes hereof includes an annular concentric surface 40 at a longitudinally intermediate socket location between shoulders 41 and 43. The diameter of surface 40 is only slightly greater than the O.D. of thread 20. With the socket in place in case aperture 34, one-piece sleeve-like wrench flats 42 having an I.D. 45 matched for a slip fit onto surface 40, is placed thereon and then secured to the socket by means of weld 44. This results in oversized wrench flats 42 of dimension A which, pursuant to DIN standard No. 16288 published April 1972, are required to be as follows:

| Socket Size - Diameter | Dimension A - mm | |
|---|---|---|
| | Square Flats | Hex Flats |
| ¼ inch | 14 | 17 |
| ½ inch | 22 | 27 |

Typically, this will effect a diametral oversize dimension B on the order of about one millimeter.

Figure 5:
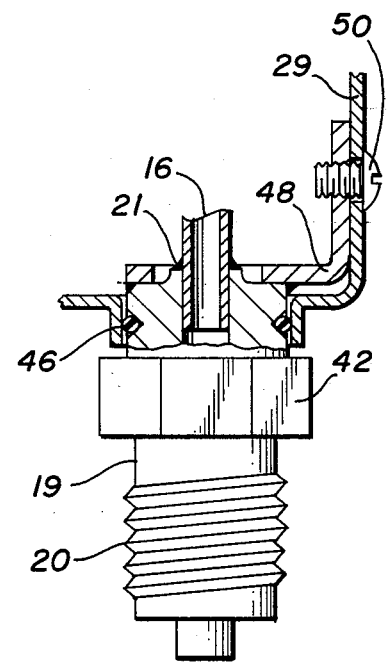
FIG. 5 is a fragmentary sectional elevation for an alternative embodiment to FIG. 3.

The alternative embodiment of FIG. 5 differs only in the manner by which socket 19 is secured to case 29 by angle bracket 48 rather than a weld 38 as in the previous embodiment and secured to case 29 by means of a screw 50. An O-ring gasket 46 provides a pressure-tight seal between the case and socket at aperture 34.

By the above description there has been disclosed a novel construction for a pressure gauge enabling wrench flat requirements of DIN standards to be met on a pressure gauge socket while retaining the attributes of forming the socket from round stock. While weld 44 has been mentioned as the preferred approach to joining the wrench flats 42 to socket 19, this, of course, requires weldably compatible metals to effect. Consequently, brazing, bonding, etc. where suitable could be just as readily utilized for that purpose. By means, therefore, of a simple yet effective approach to the problem, a ready solution has been achieved without incurring the cost penalties of an obvious approach thereto.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of an invention in which an exclusive property or privilege is claimed are defined as follows:

1. In a pressure gauge including a pressure sensitive element, a tubular socket assembled to said pressure sensitive element and adapted for connecting said pressure sensitive element to a source of fluid pressure and a case for housing said pressure sensitive element and including an aperture closely sized to accommodate said socket extending therethrough, wrench flats added secured against relative rotation to the peripheral surface of said socket at a location on said socket displaced from direct contact with said case so as to rotate said socket in either direction in conjunction with a directionally corresponding wrench rotation of said wrench flats, said wrench flats having a maximum dimension in the plane of said flats greater than the maximum pass through dimension of said case aperture.

2. In a pressure gauge according to claim 1 in which said socket is of round stock construction, and said case aperture is circular and is sealed about the socket surface thereat.

3. In a pressure gauge according to claim 2 in which said socket includes a local wrench flat receiving surface at a longitudinally intermediate location between its ends and said wrench flats are of sleeve-like section with an internal opening adapted to be slip fit onto said wrench flat receiving surface of said socket.

4. In a pressure gauge according to claim 3 in which both said wrench flat receiving surface of said socket and the internal opening of said wrench flats are annular and there is included means securing said wrench flats positioned concentrically about said receiving surface.

5. In a pressure gauge according to claim 4 in which said wrench flats are of a composition weldably compatible with said socket, and said wrench flats are secured about said socket receiving surface by a weld.

* * * * *